Sept. 14, 1965  C. S. PHELAN  3,205,927

HIGH LOAD BEARING BARREL NUT

Filed Feb. 10, 1964

INVENTOR.
CHARLES S. PHELAN
BY
Lynn H Latta
ATTORNEY

United States Patent Office 3,205,927
Patented Sept. 14, 1965

3,205,927
HIGH LOAD BEARING BARREL NUT
Charles S. Phelan, Tustin, Calif., assignor to
Frederick W. Rohe, Placentia, Calif.
Filed Feb. 10, 1964, Ser. No. 343,582
10 Claims. (Cl. 151—41.76)

This application is a continuation-in-part of my pending application Serial No. 227,946 filed October 2, 1962, for Barrel Nut With Load Carrying Improvements.

This invention relates to barrel nuts of a type wherein a nut with a non-circular base is retained in a segmental-cylindrical cradle adapted to be mounted in a bore in a mounting body and adjusted therein to register with a bolt hole intersecting the mounting bore, through which a bolt may be inserted into the nut. The general object of the invention is to provide improvements in this type of fastener assembly.

In some installations where the bolt is tightened in a barrel nut to the point where the cradle becomes heavily loaded under compression between the nut and the wall of the mounting bore, the central bridge portion of the cradle can become deformed by extrusion and downward bowing along its longitudinal axis, to the point where the nut is no longer adequately supported by the normally flat seat provided by the bridge portion of the cradle. When this occurs, the base of the nut in turn can be distorted to a bowed condition in which the threaded bore of the nut is expanded, reducing the support between the threads of the nut and the threads of the bolt to the point where the threads can be stripped and the grip of the nut upon the bolt released. A principal object of the present invention is to provide improvements in the structure and arrangement of a nut and cradle of the type referred to above, such that, even though the cradle may yield under compression, the nut base will remain undistorted and the nut thread will continue to provide maximum support for the bolt thread.

More specifically, the invention aims to provide an arrangement wherein, upon yielding of the retainer cradle under compression, the nut base will receive supplementary support directly from the bearing wall of the bore in which the barrel is installed, such as to effectively resist any tendency of the nut base to yield, and so as to continue to provide maximum support for the bolt that is threaded into the nut.

The invention further aims to provide an improved retainer connection between the retainer cradle and the nut base, including retainer pins mounted in retainer lips of the cradle and projecting loosely into socket recesses in the diagonally opposite corners of the nut base. Further, in this connection, the invention provides an arrangement wherein the retainer pins can readily be driven out of the retainer lips for detaching the nut from the cradle.

Other objects and advantages will become apparent in the ensuing specification and appended drawing in which.

Figure 1:
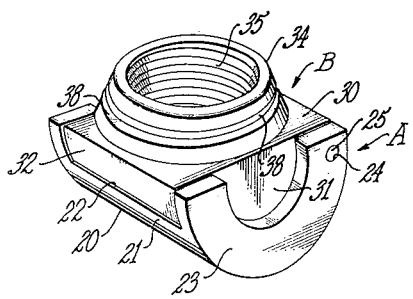
FIG. 1 is a perspective view of a cradle and nut assembly embodying my improved high load carrying features.
Figure 2:
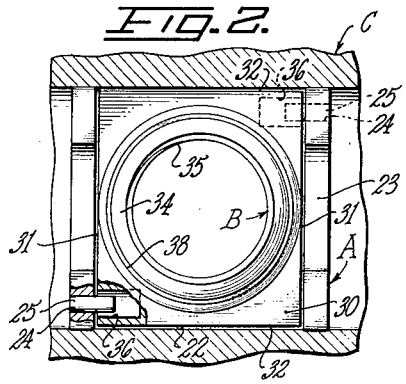
FIG. 2 is a plan view of the same assembled in a mounting body shown in axial section, with portions of the nut and cradle shown in section.

In FIGS. 1–6 I have shown the high load-carrying improvements of my invention, comprising, in general, a cradle A; a nut B retained in assembly in the cradle A; the assembly being adapted to be mounted in a transverse bore of a mounting body C and to receive a bolt (shown in phantom at D in FIG. 3) extended through a bolt hole intersecting the mounting bore, projected through the center of cradle A, and threaded into the nut B.

Mounting body C may be any member, such as a casting, in which it is desirable to establish a blind anchorage for the end of a bolt extending through another part (indicated in phantom at E) for securing the same to the body C. To receive the barrel nut assembly, a transverse mounting bore 15 is provided in the body C, and a bolt hole 16 is bored in the body C with its axis intersecting the axis of bore 15 and extending into the bore 15 from a face 17 of the body, to which the part E is to be attached.

Retainer cradle A comprises a central bridge 20 having a lateral bearing wall 21 of segmental cylindrical form, approximately 90° in circumferential extent and having a chordal nut seat 22. With reference to the plane of the major axis of the cradle parallel to the seat 22, the latter is recessed below said plane a depth approximately equal to half the radius of its cylindrical wall 21. As shown, this depth is slightly more than half the radius.

The recess depth may range from approximately half the radius to approximately 65% of the radius, but should not be of substantially greater depth since the lateral webs of bridge 20 midway between the ends of the nut, where these webs are the weakest (FIGS. 3 and 4) would be thereby unduly reduced in cross section and too weak.

It is an important feature of the invention that the several parts including the nut, the cradle and the mounting body are fabricated of metal, and it is important that the nut D be of a relatively hard, tough material so as to provide maximum strength in the internal threads thereof, resisting stripping. Normally the mounting body C will be a casting (e.g. an aluminum alloy) of sufficient hardness and bearing area so that under overloading conditions, it is the cradle that tends to yield and fail. Previously, attempts have been made to solve this problem by making the cradle of harder and more compression-resistant material, without any significant improvement. The present invention involves the discovery that the problem can be solved by proceeding in the other direction and in fact makes it possible to actually utilize a softer metal in the cradle and to thereby obtain improved results in preserving the holding power of the nut. Accordingly, the invention contemplates the use of aluminum as the material for the cradle in some installations, as well as the use of stainless steel as the material of the cradle in other installations. Where aluminum is used, the material of the cradle is actually softer than the material of the mounting body C, whereby under conditions of overloading, it is in the cradle that maximum yielding occurs, and the nut then establishes load-bearing engagement with the bore wall of the mounting body C so as to provide supplemental support added to the support still provided by the cradle. Where such supplementary load-bearing support is established, the converging relationship of the bore walls of mounting body C tends to squeeze the sides of the nut toward the bolt axis, thus counteracting the tendency of the nut to spread in response to yielding of the cradle.

The aluminum material of the cradle in most instances will be an aluminum alloy such as is commonly employed in aircraft construction, somewhat harder than pure aluminum, although the latter metal also can be utilized in special cases.

Two integral retainer fingers 23 of arcuate form, their outer margins conforming to the cylindrical contour of the inner wall of bore 15, project circumerentially from respective ends of bridge 20, beyond the axis of the cradle, the material between the fingers 23 being removed for lightness. Since fingers 23 project beyond the plane of the major axis of the cradle, they are materially higher than half the cradle radius. Diagonally opposite fingers 23 at respective ends of the cradle are provided with bores 24 extending parallel to the cradle axis on respective sides thereof.

Figure 3:
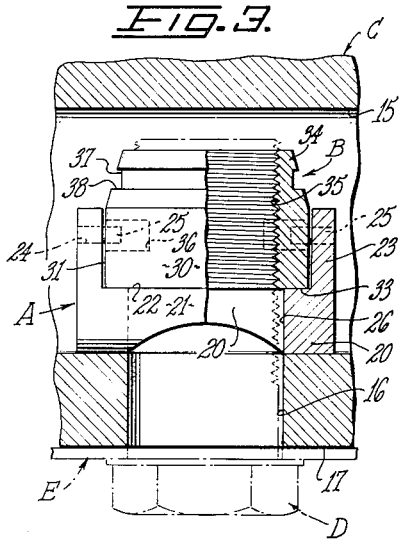
FIG. 3 is a longitudinal sectional view of the barrel nut and mounting body assembly, with the nut and cradle shown partially in side elevation.

Removably mounted in the respective bores 24 are retainer pins 25 which project inwardly from the inner faces of the respective fingers as indicated in phantom in FIG. 3. Pins 25 are mounted with a press-fit, sufficiently tight to prevent them from becoming displaced in response to vibration, etc., but such that the pins can be driven out of their bores for disassembly of the unit. A bolt opening 26 extends through the center of bridge 20.

Figure 4:
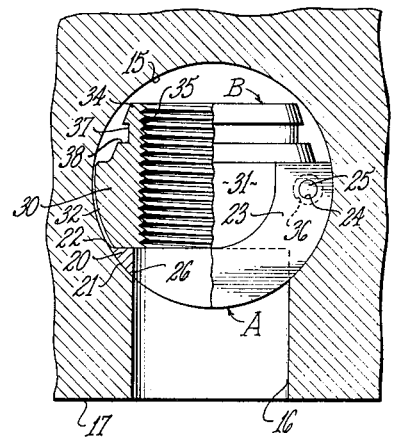
FIG. 4 is a transverse sectional view of the same with the nut and cradle shown partially in end elevation.
Figure 5:
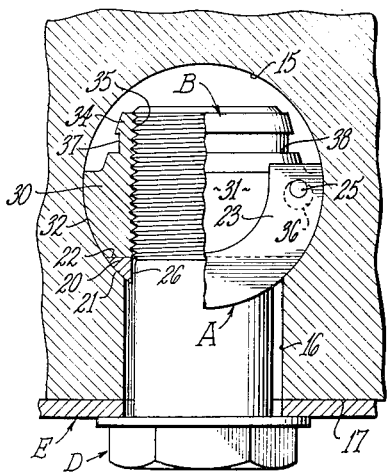
FIG. 5 is a transverse sectional view of the same, with the assembly under high compression load and the nut shown in resulting direct bearing engagement with the wall of the mounting bore.
Figure 6:
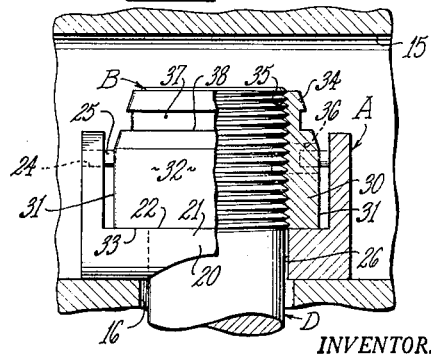
FIG. 6 is an axial sectional view of the same in highly loaded condition, with exaggerated illustration of the deformed condition of the retainer saddle.

Nut B comprises a rectangular base 30 having parallel flat end walls 31 embraced between the fingers 23 of the respective ends of the cradle A, with a sufficiently close fit so that the nut is restrained against rotation by the embrace of fingers 23. Base 30 has generally parallel sidewalls 32 of segmental cylindrical shape, coaxial with the major axis of the cradle A when the nut is seated therein, but on a slightly lesser radius, whereby the faces 32 are normally inset slightly inwardly from the lateral bearing face 21 of the cradle A, as shown in FIGS. 1 and 4 with some exaggeration for the purpose of illustration. The depth of base 30 is preferably about the same as the height of cradle fingers 23 above seat 22, and therefore is materially greater than half the cradle radius. The arcuate depth of side walls 32 is correspondingly greater then half the cradle radius. The base 30 has a flat bottom face 33 adapted to seat flatly against the seat 22 of cradle A. The nut B further includes a tubular nut body 34 integral with base 30 and projecting from the outer face thereof with its axis normal to the bottom face 33 and centered with respect to the same. An internally threaded bore 35 extends through the nut body 34 and the base 30.

In the opposite ends of base 30, in diagonally opposite corners thereof, are recesses 36, positioned for registration with the respective retainer pins 25 with ample clearance to accommodate self-aligning movement of the nut B transversely upon the seat 22 of retainer cradle A. The recesses 36 are of a depth such that the clearance between the inner ends of pins 25 and the bottoms of the respective recesses is greater than the length of the pins 25 within the bores 24 (e.g. the length of the bores 24 through the thickness of the fingers 23). Thus it becomes possible to drive the pins 25 inwardly into the respective recesses 36 until they are freed from their respective mounting bores 24, so that the nut B can be detached from the retainer cradle A. This becomes important especially in the larger sizes of barrel nuts which are fairly expensive and which in many instances may require the replacement of the nut without replacing the retainer cradle, or vice versa.

In the tubular nut body 34 is an annular groove 37 adapted to receive the base coil of a retainer spring such as is shown in the application of Frederick W. Rohe and Charles Phelan, Serial No. 231,758, filed October 19, 1962, for Barrel Nut Improvement—Retainer Spring. The grooves 37 has a base shoulder 38 against which the base coil may seat.

In contrast to conventional barrel nuts wherein the base flange is sufficiently thin so that the retainer pins 25 may project over its exposed end face, the base flange 30 of the present invention is of maximum depth, extending at least the full height of retainer fingers 23 above the seat 22 and thereby substantially doubling the depth of the base. As a further distinction over conventional barrel nuts, the tubular nut body 34 is of trapezoidal cross-section, having a frusto-conical lateral surface and a radial thickness, at its base, approximately equal to the full length of the base between its end face 31. The conical taper of the tubular nut body 34 corresponds, in an approximate way, to the convergence of the opposed portions of the cylindrical internal wall of bore 15.

The nut B is further distinguished over conventional barrel nuts in that the base 30 is widened between the lateral faces 32 so that the latter extend substantially full width between opposed areas of the internal wall of bore 15, spaced therefrom only by slight clearance (e.g. in the range of .001″ and .010″). Also, the lateral faces 32 of the nut base 30 are sloped to approximately conform to the convergence of the opposed areas of the bore wall, with greater width at the outer end face of the base adjoining nut body 34 and lesser width at the inner end face 33. Thus the nut is provided with maximum average width, and resultant maximum cross section.

As the aggregate result, the nut, including the base 30 and the tubular nut body 34, has maximum beam strength along the major axis of the assembly and also along the transverse axis (between lateral faces 32).

Furthermore, as the result of the segment-cylindrical contours of lateral faces 32, substantially coaxial with the internal wall of bore 15, any substantial yielding of the bridge portion 20 of retainer A under high compression loads in which the radial depth of the bridge 20 will be decreased while its length is increased by axial extrusion parallel to the major axis of the assembly, will result in the lateral faces 32 being shifted into seating engagement with the laterally opposed areas of the inner wall of bore 15, thereby providing direct support of the base by such laterally opposed areas of the bore wall.

When the lateral faces 32 establish bearing engagement with the internal bore wall 15, there is a resulting support applied to the base at every point along its full length. This is especially important at the mid points between the end faces 31, where the bending effect is at a maximum, since these central areas of lateral faces 31 receive direct support from the bore wall 15. Thus the support applied to lateral faces 32 directly resists the beam-bending tendency created by the failure of support at the seat 22.

In addition, if the compressive loading is sufficiently high so that substantial compressive loading is developed between the lateral faces 32 of the base 30 and the laterally opposed areas of the bore wall 15, a wedging action will be developed against the lateral faces 32 (because of the converging slope of these walls toward the bottom of the nut) and such wedging action will resist the tendency of the internal nut thread 35 to expand in diameter.

The increase in width of the base 30 between lateral faces 32 is especially important in the areas on the transverse axis of base 30 midway between end faces 31, where the cross sectional area between the internal thread 35 and the lateral faces is at a minimum. Here the cross sectional area of the nut is increased to approximately double that of the conventional nut (as the aggregate result of the average increase in lateral width of both base 30 and nut body 34 plus the increase in depth of the base 30). Since the strength of a beam is directly proportional to its weakest section, and since a bending load imposed upon a beam by opposing forces applied to its ends in one direction and to its center in the opposite direction, having a maximum bending effect at the center of the beam, this increase in cross section at the center is of utmost importance.

As the result of the various factors described above; the provision of maximum depth in the nut base 30 and of maximum radial wall thickness in the tubular nut body 34 at its base, and of maximum average transverse width of base 30 between lateral faces 32, with resultant maximum beam cross section at the centers of lateral faces 32; and the direct support applied to the lateral faces of base 30, the beam strength of base 30 along the major axis of the assembly is increased over that of the conventional nut, to the extent that the necessity for hardening the nut to a high level of hardness extending into the brittle range, is not required.

I claim:

1. In a barrel nut assembly, in combination: a mounting body having a cylindrical mounting bore and a bolt hole intersecting said bore radially; a cradle having a segmental-cylindrical lateral wall fitted to the wall of said bore local to said bolt hole and in compressive bearing engagement therewith, said cradle having a radial bolt opening substantially aligned with said bolt hole and a chordal nut seat normal to said bolt opening and located above the bottom of said lateral wall a height no more than half the bore radius; a nut comprising a base having a chordal bottom of slightly less chordal width than said nut seat compressively seated on said nut seat, and a nut body normal to said base and projecting therefrom into the area of said bore opposite said cradle, said base having convex arcuate lateral walls diverging from said bottom to the transverse plane of said bore in generally parallel relation to the laterally-opposed areas of said bore wall, and said lateral walls being contoured for mating with said bore wall and disposed at a slightly smaller radius from their common axis than the radius of said segmental-cylindrical cradle wall when the nut is unloaded, but being in close adjacency thereto such as to establish mating supporting engagement of said lateral walls against said laterally-opposed areas in the event of yield of said nut seat under excessively high compressive loads imposed thereon by said nut; and a bolt extending through said bolt hole and opening, threaded into said nut, and loading said nut in compressive engagement with said seat.

2. A barrel nut assembly as defined in claim 1, wherein said nut body has a generally frusto-conical lateral wall converging toward its tip from maximum diameter at its junction with said base, with a taper approximately conforming to the convergence of the opposed areas of said bore wall, thereby reinforcing said nut body adjacent said base to resist radial expansion in response to high axially compressive loads.

3. A barrel nut assembly for reception in a mounting body having a cylindrical mounting bore and a bolt hole intersecting said bore radially, said assembly comprising: a cradle having a segmental-cylindrical lateral wall contoured to fit the wall of said bore local to said bolt hole for compressive bearing engagement therewith, said cradle having a radial bolt opening substantially aligned with said bolt hole and a chordal nut seat disposed in a plane normal to said bolt opening and located above the bottom of said lateral wall a height no more than half the bore radius; a nut comprising a base having a bottom seated on said nut seat and substantially coextensive therewith in area, and a nut body normal to said base and projecting therefrom into the area of said bore opposite said cradle, said base having a depth more than half the cradle radius, extending from said bottom to a plane parallel thereto and disposed beyond said major cradle axis on the side thereof away from said seat when the assembly is installed in said bore, and having convex arcuate lateral walls diverging from said bottom to the transverse plane of said major axis and is closely adjacent, generally parallel relation to the laterally-opposed areas of said bore wall, and said lateral walls being spaced apart chordally at their lines of intersection with said nut bottom, a distance slightly less than the chordal distance between said laterally opposed areas in the plane of the nut seat, such as to provide clearance between said lateral walls and the bore when the nut is in unloaded fully seated engagement with said seat, and to establish supporting engagement of said lateral walls against said laterally-opposed areas in the event of yield of said nut seat under excessively high compressive loads imposed thereon by said nut; and a bolt extending through said bolt hole and opening, threaded into said nut, and loading said nut in compressive engagement with said seat.

4. A barrel nut as defined in claim 3, wherein said cradle includes, at its ends, parallel transverse retainer members having segmental-circular outer margins fitted to said laterally-opposed areas of the bore wall, and retainer pins mounted in bores in said end members in diagonally-opposite positions and projecting, parallel to the bore axis, into retaining relation to said nut base, said base having squared ends in closely adjacent, parallel relation to the inner faces of said retainer members.

5. A barrel nut as defined in claim 3, wherein said cradle includes, at its ends, pairs of transverse, integral arcuate fingers having segmental-circular outer margins fitted to said laterally-opposed areas of the bore wall and retainer pins mounted in bores in the ends of diagonally-opposite fingers and projecting, parallel to the bore axis, into retaining relation to said nut base, said nut base having squared ends in close, parallel relation to the inner faces of said fingers, and having respective recesses receiving the respective retainer pins, said recesses extending to a depth beyond the inner ends of said pins, such that the pins can be removed from their respective fingers by driving them through said fingers into said recesses.

6. A barrel nut assembly as defined in claim 3, said base further including, at its ends, integral retainer members projecting from said seat toward the remote area of the bore wall, and retainer pins mounted in bores in said retainer members at diagonally opposite corners of said seat and projecting inwardly parallel to the bore axis, said nut base having squared ends in close, parallel relation to the inner faces of said retainer members such as to be retained thereby, and having respective recesses receiving the respective retainer pins, said recesses extending to a depth beyond the inner ends of said pins, such that the pins can be removed from their respective retainer members by driving them through said retainer members into said recesses.

7. A barrel nut assembly for reception in a cylindrical mounting bore in a mounting body having a bolt hole intersecting said bore radially, said assembly comprising: a cradle having a segmental-cylindrical lateral wall contoured to fit the wall of said bore local to said bolt hole for compressive bearing engagement therewith, with its major axis substantially coincident with the bore axis, said cradle having a radial bolt opening adapted to be substantially aligned with said bolt hole and a chordal nut seat normal to said bolt opening and located between said local bore wall and said major cradle axis; a nut comprising a base having a chordal bottom seated on and of slightly less chordal width than said nut seat, and a nut body normal to said base and projecting therefrom into the area of said bore opposite said cradle, said cradle including at its ends integral retainer members projecting from said seat toward the remote area of the bore wall, and retainer pins mounted in bores in said retainer members at diagonally opposite corners of said seat and projecting inwardly parallel to the bore axis, said nut base having squared ends in close, parallel relation to the inner faces of said retainer members such as to be retained thereby, and having respective recesses receiving the respective retainer pins, said recesses extending to a depth beyond the inner ends of said pins, such that the pins can be removed from their respective retainer members by driving them through said retainer members into said recesses, said seat being disposed substantially midway between said major axis and the bottom of the cradle, and said base having segmental-cylindrical lateral walls coaxial with said major axis, extending in diverging relation from the chordal extremities of said bottom to the top of said base, said lateral walls being substantially coaxial with said major axis and of slightly smaller radius than the opposed areas of said bore wall, and being thereby disposed in closely adjacent and substantially parallel relation to said opposed areas and separated therefrom by slight clearance spaces when the assembly is installed in the bore with the nut fully seated on said seat in substantially unloaded conditions, but shifting into support-receiving, substantially full-area engagement with said opposed areas of the bore wall in the event said seat yields under high compressive loading of the nut thereagainst.

8. A barrel nut assembly for reception in a mounting body having a cylindrical mounting bore and a bolt hole intersecting said bore radially; said assembly comprising: a cradle having a segmental-cylindrical lateral wall contoured to fit the wall of said bore local to said bolt hole for compressive bearing engagement therewith, said cradle having a radial bolt opening substantially aligned with said bolt hole and a chordal nut seat disposed in a plane normal to said bolt opening and located above the bottom of its said lateral wall a height approximately half the cradle radius, said nut seat being of considerably less chordal width than the diameter of said bore; a nut comprising a base having a chordal bottom seated on said nut seat and a nut body normal to said base and projecting therefrom into the area of said bore opposite said cradle, said base having a depth more than half the cradle radius and having lateral walls of segmental-cylindrical contour extending, throughout said depth, in diverging relation from said bottom to a plane parallel thereto and disposed beyond said major cradle axis on the side thereof away from said seat when the assembly is installed in said bore, said bottom having an area substantially coextensive with that of said nut seat, said lateral walls being of slightly smaller radius than the radius of said bore and being disposed in closely adjacent, generally parallel spaced and overhanging relation to the laterally-opposed areas of said bore wall and being spaced apart, in the plane of said bottom, a chordal distance slightly less than the chordal distance between the opposite sides of said segmental-cylindrical cradle wall in the plane of said nut seat, so as to provide clearance between said lateral walls and the bore when the nut is in unloaded, fully seated engagement with said seat, and to establish supporting engagement of said lateral walls against said laterally opposed areas in the event of yield of said nut seat under excessively high compressive loads imposed thereon by said nut; and a bolt extending through said bolt hole and opening, threaded into said nut, and loading said nut in compressive engagement with said seat.

9. A barrel nut assembly as defined in claim 8, wherein said cradle is of essentially an aluminum material and wherein said nut is of a harder and tougher metal.

10. A barrel nut assembly as defined in claim 9, wherein said cradle is of an aluminum alloy, and wherein said nut is of stainless steel.

References Cited by the Examiner

UNITED STATES PATENTS

| | | | |
|---|---|---|---|
| 2,789,457 | 4/57 | Allen | 85—32 |
| 2,920,672 | 1/60 | Bronson | 151—41.76 |

EDWARD C. ALLEN, *Primary Examiner.*